United States Patent [19]

Nejigaki et al.

[11] Patent Number: 4,912,152

[45] Date of Patent: Mar. 27, 1990

[54] ONE-PACK TYPE THERMOSETTING COMPOSITION

[75] Inventors: Kazumi Nejigaki; Kenichi Kurosawa, both of Yokohama; Isao Nishiwaki, Koganei; Yukihiro Okubo, Yokohama, all of Japan

[73] Assignee: Japan Synthetic Rubber Co., Ltd., Tokyo, Japan

[21] Appl. No.: 264,388

[22] Filed: Oct. 31, 1988

[30] Foreign Application Priority Data

Nov. 30, 1987 [JP] Japan ................................ 62-299715
Jul. 5, 1988 [JP] Japan ................................ 63-175121

[51] Int. Cl.$^4$ ............................................ C08G 18/28
[52] U.S. Cl. ........................................ 524/729; 524/753; 528/45; 528/60; 528/61; 528/62; 528/64; 528/68; 528/85
[58] Field of Search ............... 528/60, 61, 68, 62, 528/85, 64, 45; 524/729, 753

[56] References Cited

U.S. PATENT DOCUMENTS

| | | | |
|---|---|---|---|
| 3,627,735 | 12/1971 | Trapasso | 528/60 |
| 3,726,835 | 4/1973 | Bertozzi | 528/61 |
| 4,093,674 | 6/1978 | Tsutsui et al. | 528/44 |
| 4,619,985 | 10/1986 | Hess et al. | 528/49 |

*Primary Examiner*—Maurice J. Welsh
*Assistant Examiner*—Rabon Sergent
*Attorney, Agent, or Firm*—Oblon, Spivak, McClelland, Maier & Neustadt

[57] ABSTRACT

A one-pack type thermosetting composition comprising (A) at least one polyisocyanate compound having dispersed therein (B) at least one compound selected from the group consisting of (1) a solid polyfunctional compound having at least one functional group selected from the group consisting of hydrazino, primary amido and sulfamoyl groups, (2) a solid compound having at least one amidino group and (3) a solid compound having a heterocyclic ring and a plurality of active hydrogen atoms, or a one-pack type thermosetting composition comprising (A') a mixture consisting of (a) at least one polyisocyanate compound and (b) at least one high boiling polar compound, having dispersed therein (B') a solid polyfunctional compound having at least one active hydrogen atom. Said one-pack type thermosetting composition is storable and suitable for use in adhesives, sealing materials, coatings and shaped articles of resin.

18 Claims, No Drawings

ONE-PACK TYPE THERMOSETTING COMPOSITION

BACKGROUND OF THE INVENTION

This invention relates to a one-pack type thermosetting composition and particularly to a one-pack type thermosetting composition which is storable and suitable for use in applications such as adhesives, sealing materials, coatings, shaped articles of resin and the like.

Thermosetting compositions composed of a polyisocyanate compound and an active hydrogen-containing compound (e.g. a polyol compound) have heretofore been used as a two-pack type composition in which the two components are stored separately and are mixed right before the use. These two-pack type thermosetting compositions have disadvantages that a mixing operation is required before the use and it is difficult to mix the two component at a given ratio every time. Hence, there have been studied one-pack type thermosetting compositions which are a mixture of a polyisocyanate compound and an active hydrogen-containing compound.

Japanese Patent Publication No. 26927/86 discloses a one-pack type thermosetting composition in which a solid polyhdroxy compound is dispersed in a liquid prepolymer of an aromatic polyisocyanate compound. Japanese Patent Application Kokai (Laid-Open) Nos. 26922/76 and 177014/77 disclose a one-pack type thermosetting composition composed of an organic polyisocyanate and a metal complex of diphenylaniline.

However, the composition disclosed in Japanese Patent Publication No. 26927/86 has the problems that it has low storage stability and requires high curing temperature of at least 130° C. The composition disclosed in Japanese Patent Application Kokai (Laid-Open) Nos. 26,922/76 and 177,014/77 has the problem that it loses its thermosetting ability when stored for about a month.

SUMMARY OF THE INVENTION

The object of this invention is to provide a one-pack type thermosetting composition which i free from the above problems and has high storage stability and can be set at a low temperature.

According to this invention, there is provided a one pack-type thermosetting composition (hereinafter referred to as the composition I) comprising:

(A) at least one polyisocyanate compound having dispersed therein (B) at least one compound selected from the group consisting of:

(1) a solid polyfunctional compound having at least one functional group selected from a hydrazino group, a primary amido group, a primary thioamido group and a sulfamoyl group, (2) a solid compound having at least one amidino group and (3) a solid compound having a heterocyclic ring and a plurality of active hydrogen atoms.

This invention further provides a one-pack type thermosetting composition (hereinafter referred to as the composition II) comprising:

(A') a mixture consisting of (a) at least one polyisocyanate compound and (b) at least one high boiling polar compound having a high boiling point, having dispersed therein (B') a solid polyfunctional compound having at least one active hydrogen atom.

DETAILED DESCRIPTION OF THE INVENTION

The polyisocyanate compound used as the component (A) and the component (A') in the compositions I and II of this invention, respectively, is a compound having a plurality of, preferably 2–3, isocyanate groups in the molecule. As the polyisocyanate compound, there can be used, for example, aliphatic, aromatic and alicyclic polyisocyanate compounds.

The polyisocyanate compound includes diisocyanate compounds such as xylylene diisocyanate, polyphenylmethane diisocyanate, 4,4'-diphenllmethane diisocyanate, isophorone diisocyanate, tolylene diisocyanate, hexamethylene diisocyanate, naphthalene diisocyanate, hydrogenated diphenylmethane diisocyanate, hydrogenated xylylene diisocyanate, dicyclohexylmethane diisocyanate and the like; and compounds having in the molecule an allophanate bond, an isocyanurate bond, a carbodiimide bond and the like and having a plurality of isocyanate groups in the molecule, such as the dimers, trimers or polymers of the above diisocyanate compounds and the like.

The polyisocyanate used in this invention may be a prepolymer having a plurality of isocyanate groups in the molecule, which is obtained by reacting a polyisocyanate with an active hydrogen-containing compound (hereinafter referred to as active hydrogen compound) such as a polyol, a polyamine or the like. Such a prepolymer can be obtained by, for example, reacting a polyisocyanate with an active hydrogen compound at 20°–90° C. for 1–6 hours.

Specific examples of the polyol used for the reaction with a polyisocyanate compound to obtain a prepolymer include polyhydric alcohols such as ethylene glycol, propylene glycol, polyethylene glycol, polypropylene glycol, trimethylolpropane, diethylene glycol, triethylene glycol, hexamethylene glycol, glycerine, 1,3-butylene glycol, 1,4-butanediol, hexanetriol, pentaerythritol derivatives, sorbitol, neopentyl glycol and the like; polyether polyols obtained by addition polymerization between said polyhydric alcohol and an alkylene oxide (e.g. ethylene oxide, propylene oxide or the like); polyester polyols obtained by condensation reaction between said polyhydric alcohol and a polybasic acid (e.g. maleic acid, succinic acid, adipic acid, sebacic acid, tartaric acid, terephthalic acid, isophthalic acid or the like); polyesterpolyols obtained by ring-opening polymerization of a lactone (e.g. γ-caprolactone, ε-valerolactone or the like); acrylic polymers or methacrylic polymers having hydroxyl group obtained by homopolymerizing a hydroxyl group-containing acrylate monomer or methacrylate monomer (e.g. hydroxyethyl acrylate, hydroxybutyl acrylate, trimethylolpropane monoacrylate, trimethylpropane monomethacrylate or the like) or by copolymerizing said acrylate monomer or methacrylate monomer with a copolymerizable monomer (e.g. acrylic acid, methacrylic acid, styrene, acrylonitrile, α-methylstyrene or the like); castor oil and its derivatives; and epoxy polymers having hydroxyl group obtained by reacting an epoxy resin having an epoxy group at both terminals with monoethanolamine, diethanolamine or the like.

Specific examples of the polyamine componnd used for the reaction with a polyisocyanate compound to obtain a prepolymer include aliphatic polyamine compounds such as ethylenediamine, diethylenetriamine, triethylenetetramine, tetraethylenepentamine, pentaethylenehexamine, tetramethylenediamine, pentamethylenediamine, hexamethylenediamine, cyclohexylenediamine, isophoronediamine, melamine, their derivatives and the like; and aromatic polyamine compounds such as o-phenylenediamine, m-phenylenediamine, p-phenylenediamine, 4,4' diaminodiphenylmethane, 4,4'-diaminodiphenylsulfone, 4,4'-diaminodiphenyl ether, 2,4-diaminodiphenylamine, 1,5-diaminonaphthalene, 1,8-diaminonaphthalene, 2,4diaminotoluene and the like.

When a polyol compound is used as the active hydrogen compound for forming a prepolymer having a plurality of isocyanate groups in the molecule, the polyol is desired to have a molecular weight of preferably 10,000 or less, especially preferably 1,000–7,000. In this case, the resulting composition gives a cured resin with toughness and elasticity.

In this invention, the polyisocyanate compounds as mentioned above can be used alone or in combination of two or more.

In the polyisocyanate compound used in this invention, the proportion of the total isocyanate groups to the total amount of polyisocyanate compounds is preferably 2–20% by weight, more preferably 3–15% by weight. In this case, the resulting composition has a relatively low curing temperature and high storage stability.

In the polyisocyanate compound of this invention, all or a part of the isocyanate groups can be blocked.

The blocking agent used for blocking the isocyanate groups includes, for example, alcohols such as ethanol, propanol, butanol, isobutanol and the like; phenols such as phenol, cresol, xylenol, p-nitrophenol and the like; carbonyl compounds such as ethyl malonate, ethyl acetoacetate, acetylacetone and the like; acid amides such as acetamide, acrylamide and the like; acid imides such as succinimide, maleimide and the like; imidazoles such as 2-ethylimidazole, 2-ethyl-4-methylimidazole and the like; lactams such as 2-pyrrolidone, ε-caprolactam and the like; and oximes such as acetoxime, methylethylketoxime, diacetylmonoxime, cyclohexanonoxime and the like.

The blocking agent is reacted with the polyisocyanate compound according to a conventional method, for example, in the presence or absence of a solvent containing no active hydrogen and capable of dissolving the blocking agent, at a temperature of room temperature to 80° C. for about 0.5–hours, whereby a blocked polyisocyanate compound can be prepared.

The blocked polyisocyanates generate isocyanate groups when heated.

In the composition I of this invention, the component (B) is at least one compound (hereinafter referred to as the specific solid compound (B)) selected from:

(1) a solid polyfunctional compound having at least one functional group selected from a hydrazino group, a primary amido group, a primary thioamido group and a sulfamoyl group (hereinafter referred to as the compound (B-1)), (2) a solid compound having at least one amidino group (hereinafter referred to as the compound (B-2)) and (3) a solid compound having a heterocyclic ring and a plurality of active hydrogen atoms (hereinafter referred to as the compound (B-3)).

The compound (B-1) may further have a group reactive to the isocyanate group, such as amino, hydroxyl or the like. The compound (B-2) may also have a group reactive to the isocyanate group.

In the composition I, examples of the solid polyfunctional compound having hydrazino groups include compounds having two hydrazino groups in the molecule, such as succinic acid dihydrazide, adipic acid dihydrazide, sebacic acid dihydrazide, dodecanediacid dihydrazide, hexanediacid dihydrazide, eicosanediacid dihydrazide, carboxylic acid dihydrazides, azelaic acid dihydrazide, oxalic acid dihydrazide, isophthalic acid dihydrazide, terephthalic acid dihydrazide, hexahydoisophthalic acid dihydrazide, hexahydroterephthalic acid dihydrazide, methylaminodipropionic acid dihydrazide, phenylaminoproponic acid dihydrazide, methylaminodibutyric acid dihydrazide, ethylaminodivaleric acid dhydrazide, 1-bis(hydrazinocarboethyl)-5-isopropylhydantoin and the like; compounds having at least three hydrazino groups in the molecule, such as citric acid trihydrazide, cyclohexanetricarbxxylic acid trihydrazide and the like; compounds having a hydrazino group and an amino group in the molecule, such as semicarbazide and the like; and compounds having a hydrazino group and a hydroxyl group in the molecule, such as p-oxybenzoic acid hydrazide.

Examples of the solid polyfunctional compound having primary amido groups include compounds having two primary amido groups in the molecule, such as succinic acid diamide, adipic acid diamide, maleic acid diamide, malonic acid diamide, sebacic acid diamide, dodecanediacid diamide, hexadecanediacid diamide, eicosanediacid diamide, biuret, isophthalic acid diamide and the like; compounds having at least three primary amido groups in the molecule, such as citric acid triamide, cyclohexanetricarboxylic acid triamide and the like; and compounds having a hydrazino group and a primary amido group in the molecule, such as oxamic hydrazide.

Examples of the solid polyfunctional compound having a primary tho amido group include compounds having two primary thioamido groups in the molecule, such as succinic acid dithioamide, adipic acid dithioamide, maleic acid dithioamide, malonic acid dithioamide, sebacic acid dithioamide, dodecanediacid dithioamide, hexadecanediacid dithioamide, eicosanediacid dithioamide, isophthalic acid dithioamide and the like; compounds having at least three primary thioamido groups in the molecule, such as citric acid trithioamide, cyclohexanetricarboxylic acid trithioamide and the like; and compounds having a primary thioamido group and an amino group in the molecule, such as thiourea and the like.

Examples of the solid polyfunctional compound having a sulfamoyl group include compounds having two sulfamoyl groups in the molecule, such as butanedisulfamide, hexanedisulfamide, benzenedisulfamide and the like.

Examples of the compound (B-2) include compounds having one amidino group in the molecule, such as dicyandiamide, cyclohexanecarboxamidine and the like; compounds having two amidino groups in the molecule, such as pentanediamidine, oxalic diamidine, isophthalic diamidine, biguanide and the like; compounds having at least three amidino groups in the molecule, such as 1,1,3,3-propanetetracarboxamddine and the like; compounds having n amidino group and an amino group in the molecule, such as guanidine and the like; and compounds having an amidino group and a primary amido group in the molecule, such as 3-guanidinopropionamide and the like.

The compound (B-3) preferably has an amino group as an active hydrogen-containing group and include, for example, melamine, monomethylolmelamne, diallylmelamine, aminoimidazoylmelamnne, 2,4-diamino-6-[2-methllimidazolyl-(1)]ethyltriazine, 2,4-diamino-6[2-ethylimidazoylyl-(1)]ethyltriazine, 2,4-diamino6-[2-ethyl-4-methylimidazolyl-(1)]ethytriazine, 2,4-diamino-6-[2-undecylimidazolyl-(1)]ethyltriazine, benzoguanamine, trithiocyanuric acid and their derivatives.

Of the above components (B), preferable specific solid compounds () are adipic acid dihydrazide, eicosanediacid dihydrazide, melamine, aminoimidazoyl-melamine, etc.

In this invention, the specific solid compounds as the component (B) can be used alone or in combination of two or more.

The specific solid compound (B) is used in such a proportion that the equivalent ratio of the isocyanate groups possessed by the component((A) to the total amount of the groups reactive to the isocyanate groups possessed by the specific solid compound (B) (i.e. the isocyanate groups/the groups reactive to the isocyanate groups) is preferably 0.3–5, more preferably 0.5–3.

In this invention, there may be used, in combination with the specific solid compounds (B), a solid polyhydroxy compound containing none of the hydrazino group, the primary amido group, the primary thioamido group, the sulfamoyl group, the amino group and the heterocyclic ring. When such a solid polyhydroxy compound is used in combination with the specific solid compound (B), the equivalent ratio of the isocyanate groups to the hydroxyl groups is preferably at least 25. When the equivalent ratio is less than 2.5, the proportion of the hydroxyl groups becomes higher and the resulting composition has a decreased storage stability. The solid polyhydroxy compound includes pentaerythritol, dipentaerythritol, tripentaerythritol, methyl α-glucoside of corn starch, corn starch, sucrose, lactose, d-mannitol, anhydrous sorbitol, dulcitol, erythritol, isopropylidene-bis(β-hydroxyethoxyhhenol), 1,4-di(β-hydroxyethoxy)phenol, 5-methylol-5-ethyl-2-(1,1-dimethyl-2-hydroxyethyl)-1,3-dioxane, 5,5-di-methylol-2-(1,1-dimethyl-2-hydroxyethyl)-1,3-dioxane, etc.

The specific solid compound (B) preferably has the same melting point as or a higher melting point than the curing temperature of the composition I, for example, at least 60° C. The specific solid compound (B) more preferably has a melting point of about 85–200 ° C. because the composition I is cured ordinarily at 80–200° C.

Further, the specific solid compound (B) is preferably finely ground because it must be dispersed in the polyisocyanate compound in the composition I of this invention. When the particles of the specific solid compound (B) have particle diameters of about 50μ or less, the resulting composition gives excellent toughness and excellent elasticity when cured.

The composition I of this invention may contain a curing accelerator if necessary. However, the use of a curing accelerator which promotes the curing, the dimerization and the trimerization of the polyisocyanate compound at room temperature, is not desirable because it reduces the storage stability of the resulting composition. Examples of the curing accelerator usable in the composition I include salts of 1,8-diazabicyclo(5,4,0)undecene-7 (hereinafter referred to as DBU) such as mono DBU salt of orthophthalic acid, mono DBU salt of adipic acid, partial DBU salt of phenolic novolac resin and the like; acetylacetonates such as iron (III) acetylacetonate, manganese (III) acetylacetonate, zinc (II) acetylacetonate and the like; imidazoles such as 2-methylimidazole, 2-heptadecylimidazole and the like; and curing accelerators for epoxy resin. These curing accelerators are commercially available under the brand names of, for example, U-CAT SA-821, U-CAT SA-841, U-AAT SA-841 and U-CAT SA-851 (these are products of SAN-APRO LTD.).

The composition I of this invention may further contain a filler if necessary. Examples of the filler include talc, calcium carbonate, clay, synthetic silica, synthetic zeolite, bentonite, zinc white, titanium dioxide, dry carbon black, glass particles and their surface-treated products. Of these fillers, synthetic silica is preferred for the purpose of preventing the sagging of the composition I during the heat-curing. A hydrophobic synthetic silica whose surface is treated with an organosilicon compound is especially preferred because it does not change the properties of the composition I.

The composition I of this invention may furthermore contain, if necessary, a conventional coloring agent, a conventional stabilizer, a conventional plasticizer, a conventional thickening agent and the like.

The polar compound having a high boiling point used as the component (A') in the composition II of this invention is desired to have the same melting point as or a lower melting point than the curing temperature of the composition II and also to have a boiling point higher than the curing temperature or the maximum use temperature of the composition II, for example, a boiling point of at least 140° C. The use of such a polar compound having a high boiling point enables the control of the curing temperature and curing rate of the composition II of this invention. However, a compound capable of easily dissolving a solid polyfunctional compound having at least one active hydrogen atom as the component (B'), at temperatures of 40° C. or less should not be used as the polar compound having a high boiling point from the standpoint of storage stability.

The polar compound having a high boiling point includes, for example, polar compounds having a high boiling point and a melting point of less than 20° C., such as propylene carbonate, γ-butyrolactone, γ-valerolactone, δ-valerolactone, N-methyl-ε-caprolactam, N-methylpyrrolidone, cyclohexanone, furfural, N-methylformamide, N,N-dimethylacetamide, diethylene glycol monoethyl ether acetate, diethylene glycol diaceaate, acetonylacetone, methyl cyanoacetate, tetramethylurea, diethylene glycol dimethyl ether, triethylene glycol dimethyl ether and the like, as well as high boiling polar compounds having a melting point of 20° C. or more, such as ethylene carbonate, α-piperidone, sulfolene, succinonitrile, diaminomaleonitrile, p-nitroanisole, methyl carbamate, isopropyl carbamate, acetamide, N-metylacetamide, succinic anhydride, diphenyl carbonate and the like. Preferred of these are carbonic acid esters such as propylene carbonate, ethylene carbonate and the like and lactones such as γ-butyrolactone, γ-valerolactone, δ-valerolactone and the like.

In the composition II of this invention, these polar compounds having a high boiling point can be used alone or in combination of two or more.

The polar compounds having a boiling point is used in a proportion of preferably 0.1-20 parts by weight, more preferably 1-10 parts by eight, per 100 parts by weight of the polyisocyanate compounds. In this case, the resulting composition II is curable at low temperatures and has a good storage stability.

As the component (B') in the composition II of this invention, there is used a solid polyfunctional compound having at least one active hydrogen atom reactive to the isocyanate group (hereinafter referred to as the active hydrogen solid compound), and includes, for example, the components (B) used in the composition I of this invention, i.e. the compounds (B-1), the compounds (B-2) and the compounds (B-3), as well as compounds similar to the solid polyhydroxy compounds used optionally in the composition I of this invention.

Of the above, preferable as the active hydrogen solid compound are adipic acid dihydrazide, eicosanediacid dihydrazide, melamine, aminoimidazoylmelamine, etc.

In the composition II of this invention, the active hydrogen solid compounds can be used alone or in combination of two or more.

In the composition II of this invention, the active hydrogen solid compound is used in such a proportion that the equivalent ratio of the isocyanate groups possessed by the component (A') to the total amount of the groups reactive to said isocyanate groups possessed by the active hydrogen solid compound (i.e. the isocyanate groups/the groups reactive to the isocyanate groups) is preferably 0.3-5, more preferably 0.5-3.

The active hydrogen solid compound has the same melting point and particle size as those of the specific slid compound (B) used in the composition I of this invention.

The composition II of this invention may contain, if necessary, the same curing accelerator, filler, coloring agent, stabilizer, plasticizer, thickening agent, etc. as used in the composition I of this invention.

The one-pack type thermosetting composition of this invention has excellent elongation at break and excellent strength at break when cured, has high storage stability, is curable at low temperatures, and is suitable for use particularly in adhesives, sealing materials, coatings, shaped articles of resin, etc.

DESCRIPTION OF PREFERRED EMBODIMENTS OF THE INVENTION

This invention is described in more detail below referring to Examples. However, it should not be understood that this invention is limited to these Examples. In the Examples, parts and % are by weight unless otherwise specified.

EXAMPLE 1

To reaction were subjected 46 parts of a polyether polyol having an average molecular weight of 2,000 (EXCENOL 2020, product of Asahi Glass Co., Ltd.), 25 parts of a polymeric 4,4'-diphenylmethane diisocyanate (SUMIDUR 44V-20, product of SUMIOOMO BAYER URETHANE CO., LTD.) and 8 parts of hydrogenated xylylene diisocyanate (TAKENATE 600, product of Takeda Chemical Industries, Ltd.) at 80° C. for 2 hours to prepare a prepolymer having an isocyanate group content of 11.9% based on the weight of the prepolymer having a plurality of isocyanate groups. This prepolymer was mixed with 15 parts of a synthetic zeolite (5A) and 6 parts of talc (Kunimine Talc, product of Kunimine Kogyo K.K.) to obtain a polyisocyanate component.

To 100 parts of this polyisocyanate component were added 25.7 parts of sebacic acid dihydrazide (the equivalent ratio of NCO to $NH_2 = 1:1$), 5 parts of a partial DBU salt of a phenolic novolac resin (U-CAT SA 841, product of SAN-APO LTD.) and 3 parts of a hydrophobic silica whose surface had been treated with an organosilicon compound (AEROSIL RY 200, product of NIPPON AEROSIL CO., LTD.) to obtain a one-pack type thermosetting composition.

EXAMPLE 2

To reaction were subjected 57 parts of a polyether polyol having an average molecular weight of 7,000 (EXCENOL 850, product of Asahi Glass Co., Ltd.) and 23 parts of a polymeric 4,4'-diphenylmethane diisocyanate (SUMIDUR 44V-20) at 80° C. for 6 hours to prepare a prepolymer having an isocyanate group content of 7.5% based on the weight f prepolymer having a plurality of isocyanate groups. This prepolymer was mixed with 20 parts of a synthetic zeolite (4A) to obtain a polyisocyanate component.

To 100 parts of this polyisocyanate component were added 5.2 parts of adipic acid amide (the equivalent ratio of NCO to $NH_2 = 2:1$) and 3 parts of a partial DBU salt of a phenolic novolac resin (U-CAT SA 831, product of SAN-APRO LTD.) to obtain a one-pack type thermosetting composition.

EXAMPLE 3

To reaction were subjected 43.8 parts of a polyester polyol having an average molecular weight of 3,000 (KURAPOL P-3010, product of KURARAY CO., LTD.) and 36.2 parts of a polymeric 4,4'-diphenylmethane diisocyanate (SUMIDUR 44V-20) at 80° C. for 2 hours to prepare a prepolymer having an isocyanate group content of 12.5% based on he weight of prepolymer having a plurality of isocyanate groups. This prepolymer was mixed with 10 parts of a synthetic zeolite (5A), 8 parts of talc (Kunimine Talc TF) and 2 parts o bentonite (D ORBEN, product of Shiraishi Kogyo Kaisha, Ltd.) to obtain a polyisocyanate component.

To 100 parts of this polyisocyanate component were added 3.1 parts of pentaerythritol (the equivalent ratio of NCO to OH $=2.0:1$), 6.2 parts of dicyandiamide, 2 parts of a partial DBU salt of a phenolic novolac resin (U-CAT SA 831) and 0.1 part of zinc (II) acetylacetonate to obtain a one-pack type thermosetting composition.

EXAMPLE 4

The same procedure as in Example 2 was repeated, except that the 5.2 parts of adipic acid amide used in Example 2 was replaced by 6 parts of melamine (the equivalent ratio of NCO to $NH_2 = 1:1$), to obtain a one-pack type thermosetting composition.

EXAMPLE 5

The same procedure as in Example 1 was repeated, except that 2 parts of propylene carbonate was also added to 100 parts of the polyisocyanate compound, to obtain a one-pack type thermosetting composition.

EXAMPLE 6

The same procedure as in Example 2 was repeated, except that 4 parts of γ-valerolactone was also added to 100 parts of the polyisocyanate compound, to obtain a one-pack type thermosetting composition.

EXAMPLE 7

The same procedure as in Example 4 was repeated, except that 2 parts of γ-butyrolactone was also added to 100 parts of the polyisocyanate compound, to obtain a one-pack type thermosetting composition.

EXAMPLE 8

The same procedure as in Example 1 was repeated, except that the 5 parts of a partial DBU salt of the phenolic novolac resin (U-CAT SA 841) was replaced by 8 parts of ethylene carbonate, to obtain a one-pack type thermosetting composition.

COMPARATIVE EXAMPLE 1

The same procedure as in Example 1 was repeated, except that the 25.7 parts of sebacic acid dihydrazide was replaced by 7.6 parts of pentarythritol (the equivalent ratio of NCO to OH =1:1) and the partial DBU salt of the phenolic novolac resin was not used, to obtain a one-pack type thermosetting composition.

COMPARATIVE EXAMPLE 2

The same procedure as in Example 2 was intended to be repeated, except that the 5.2 parts of adipic acid amide was replaced by 14.3 parts of 3,4′-diaminodiphenyl ether (the equivalent ratio of NCO to $NH_2$=1:1) and the partial DBU salt of the phenolic novolac resin was not used. However, gel was formed in the resulting mixture.

COMPARATIVE EXAMPLE 3

The same procedure as in Example 2 was repeated, except that the 5.2 parts of adipic acid amide was replaced by 2.4 parts of pentaerythritol (the equivalent ratio of NCO to OH =1:2), to obtain a one-pack type thermosetting composition.

TEST 1 MEASUREMENT OF STORAGE STABILITY

Each of the compositions obtained in Examples 1-8 and Comparative Examples 1 and 3 was placed in a 50-ml glass-made sample bottle with a lid, and the bottle was stored in a constant temperature bath at 40° C. The days required for the composition to cure during the storage were measured as the stability of the composition. The results are shown in Table 1.

TEST 2 MEASUREMENT OF HEAT-CURING TIME

In order to examine the curing rate at various temperatures, of each of the compositions obtained in Examples 1-8 and Comparative Examples 1 and 3, the heat-curing time required for the composition to cure and give a torque value of 1.0 kg.cm was measured under the following test conditions using a curing rate tester (JSR Curastometer Model III, product of Nichigo Shoji K.K.). For information, the stage at which a composition gives a torque value of 1.0 kg.cm can be regarded as stage that when the composition has been used, for example, as an adhesive, the composition has come to possess a strength sufficient to withstand an external force applied to the bonded portion, that is, the composition now has a strength at which clamp-of is possible.

| Measurement conditions | |
|---|---|
| Angle of vibrational amplitude: | ¼ degree (0.25°) |
| Number of vibration: | 100 cycles/min |

The results are shown in Table 1.

TABLE 1

| Composition | Storage stability (days) | Heat-curing time (min) Cured at 80° C. | Cured at 100° C. | Cured at 120° C. |
|---|---|---|---|---|
| Example 1 | More than 120 | 60 | 4 | 1 |
| Example 2 | More than 120 | 80 | 5 | 2 |
| Example 3 | 25-30 | 50 | 5 | 2 |
| Example 4 | More than 120 | 80 | 5 | 1 |
| Example 5 | 60 | 30 | 3 | 0.5 |
| Example 6 | 60 | 15 | 1 | 0.5 or less |
| Example 7 | 60 | 30 | 3 | 0.5 |
| Example 8 | 50 | 20 | 2 | 0.5 or less |
| Comparative Example 1 | 40 | Not cured | Not cured | 80 |
| Comparative Example 3 | 10-15 | 150 | 15 | 4 |

TEST 3 MEASUREMENT OF PROPERTIES OF CURED RESIN SHEET

Each of the compositions obtained in Examples 1-8 and Comparative Examples 1 and 3 was sandwiched in between two Teflon sheets. Then, the compositions of Examples 1-4 and Comparative Examples 1 and 3 were press-molded at 120° C. for 2 hours and the compositions of Examples 5-8 were press-molded at 100° C. for 1 hour to prepare respective cured resin sheets each of 2 mm in thickness. JIS No. 2 dumbbell specimens were punched out from each sheet. The Teflon sheets were peeled off from the dumbbell specimens. The resulting specimens were subjected to a tensile test at a drawing rate of 200 mm/min to measure a strength at break and an elongation at break using Autograph AG-5000B (product of Shimadzu Corp.). The results are shown in Table 2.

TABLE 2

| Composition | Properties of cured resin sheet | |
|---|---|---|
| | Elogation at break (%) | Strength at break (kg/cm²) |
| Example 1 | 40 | 165 |
| Example 2 | 60 | 120 |
| Example 3 | 40 | 140 |
| Example 4 | 45 | 160 |
| Example 5 | 40 | 160 |
| Example 6 | 55 | 120 |
| Example 7 | 40 | 150 |
| Example 8 | 60 | 140 |
| Comparative Example 1 | 20 | 120 |
| Comparative Example 3 | 25 | 115 |

TEST 4 MEASUREMENT OF T-PEEL STRENGTH

Steel plates of 0.8 mm in thickness having a bonding area of 150 mm×25 mm were subjected to a preliminary treatment with a primer (MIGHTY GRIP 9025, product of Japan Synthetic Rubber Co., Ltd.). Then, the bonding area was coated with one of the compositions obtained in Examples 1-8 and Comparative Examples 1 and 3, and in a constant temperature bath, the plates coated with the compositions of Examples 1-4 and Comparative Examples 1 and 3 were heated at 120° C. for 2 hours and the plates coated with the compositions of Examples 5-8 were heated at 100° C. for 1 hour to cure the compositions, whereby T-peel test pieces were prepared. These test pieces were subjected to a T-peel test at a drawing rate of 100 mm/min to measure a T-peel strength using Autograph AG-5000B. The T-peel strength was indicated by a breakage equilibrium value obtained by the test. The results are shown in Table 3.

TEST 5 MEASUREMENT OF SHEAR STRENGTH

Each bonding area (12.5 mm×25 mm) of steel plates [100 mm×25 mm×1.6 mm (thickness)]were subjected to a preliminary treatment with a primer (MIGHTY GRIP 9025). Then, the bonding area was coated with one of the compositions obtained in Examples 1-8 and Comparative Examples 1 and 3, and in a constant temperature bath the plates coated with the composition of Examples 1-4 and Comparative Examples 1 and 3 were heated tt 120° C for 2 hours and the plates coated with the compositions of Examples 5-8 were heated at 100° C. for 1 hour to cure the composition, whereby shear test pieces were prepared. These test pieces were subjected to a shear strength test at a drawing rate of 5 mm/min to measure a shear strength using Autograph AG-5000B. The results are shown in Table 3.

TABLE 3

| Composition | T-peel strength (kg/25 mm) | Shear strength (kg/cm$^2$) |
|---|---|---|
| Example 1 | 22 | 138 |
| Example 2 | 25 | 105 |
| Example 3 | 30 | 150 |
| Example 4 | 20 | 140 |
| Example 5 | 25 | 145 |
| Example 6 | 25 | 110 |
| Example 7 | 22 | 140 |
| Example 8 | 25 | 120 |
| Comparative Example 1 | 15 | 90 |
| Comparative Example 3 | 16 | 110 |

What is claimed is:

1. A one-pack thermosetting composition for adhesion, comprising:
   (A) at least one polyisocyanate compound having dispersed therein
   (B) at least one compound selected from the group consisting of:
     (i) a solid polyfunctional compound having at least one functional group selected from the group consisting of hydrazino, primary amido, primary thioamido and sulfamoyl,
     (ii) a solid compound having at least one amidino group, and
     (iii) a solid compound having a heterocyclic ring and a plurality of active hydrogen atoms; and
   (C) a solid polyhydroxy compound which does not contain any of the hydrazino, primary amido, primary thioamido, sulfamoyl, amidino and heterocyclic rings which are dispersed along with the (B) component in the (A) component.

2. The composition according to claim 1, wherein the polyisocyanate compound (A) is an aliphatic, aromatic or alicyclic compound having 2-3 isocyanate groups in the molecule, or a dimer, timer or polymer thereof.

3. The composition according to claim 1, wherein the polyisocyanate compound is a prepolymer having a plurality of isocyanate groups in the molecule.

4. The composition according to claim 3, wherein the prepolymer is a reaction product of a polyisocyanate compound with an active hydrogen-containing compound.

5. The composition according to claim 1, wherein, in the polyisocyanate compound (A), the total amount of the isocyanate groups is 2-20% by weight based on the 6. The composition according to claim 1, wherein the component (B) has a melting point of 85-200° C.

7. The composition according to claim 1, wherein the component (B) is in the form of particles having particle diameters of 30μ or less.

8. The composition according to claim 1, wherein the component (B) is used in the proportion that the equivalent ratio of the isocyanate groups possessed by the component ()) to the total amount of the groups reactive to said isocyanate groups possessed by the specific solid compound (B) the isocyanate groups/the groups reactive to the isocyanate groups) is 0.3-5.

9. A one-pack type thermosetting composition comprising:
   (A') a mixture consisting of (a) at least one polyisocyanate compound and (b) at least one polar compound having a high boiling point, having dispersed therein
   (B') a solid polyfunctional compound having at least one active hydrogen atom.

10. The composition according to claim 9, wherein the polyisocyanate compound is an aliphatic, aromatic or alicyclic compound having 2-3 isocyanate groups in the molecule or a dimer, trimer or polymer thereof.

11. The composition according to claim 9, wherein the polyisocyanate compound is a prepolymer having a plurality of isocyanate groups in the molecule 12. The composition according to claim 2, wherein the prepolymer is a reaction product of a polyisocyanate compound with an active hydrogen-containing compound.

13. The composition according to claim 9, wherein the polar compound having a high boiling point has a melting point of less than 20° C.

14. The composition according to claim 9, wherein the polar compound having a high boiling point has a melting point of 20° C. or more.

15. The composition according to claim 9, wherein the polar compound having a high boiling point is at least one compound selected from the group consisting of propylene carbonate, ethylene carbonate, γ-butyrolactone, γ-valerolactone and δ-valerolactone.

16. The composition according to claim 9, wherein the proportion of the polar compound having a high boiling point is 0.1-20 parts by weight per 100 parts by weight of the polyisocyanate compound.

17. The composition according to claim 9, wherein the solid polyfunctional compound having at least one active hydrogen atom is at least one compound selected from the group consisting of:
   (1) a solid polyfunctional compound having at least one functional group selected from the group consisting of a hydrazino group, a primary amido group, a primary thioamido group and a sulfamoyl group,
   (2) a solid compound having at least one amidino group, (3) a solid compound having a heterocyclic ring and a plurality of active hydrogen atoms, and
(4) a solid polyhydroxy compound.

18. The composition according to claim 9, wherein the compound (B') is used in the proportion that the equivalent ratio of the isocyanate groups possessed by the component (A') to the total amount of the groups reactive to said isocyanate groups possessed by the component (B') (i.e., the isocyanate groups/the groups reactive to the isocyanate groups) is 0.3–5.

* * * * *